(12) United States Patent
McReynolds

(10) Patent No.: US 10,595,470 B2
(45) Date of Patent: Mar. 24, 2020

(54) SYSTEM AND METHOD FOR HORTICULTURAL LIGHTING

(71) Applicant: Lumileds LLC, San Jose, CA (US)

(72) Inventor: Alan McReynolds, Los Altos, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/447,645

(22) Filed: Jun. 20, 2019

(65) Prior Publication Data

US 2019/0297785 A1    Oct. 3, 2019

Related U.S. Application Data

(63) Continuation of application No. 15/590,847, filed on May 9, 2017.

(51) Int. Cl.
*A01G 7/04* (2006.01)
*H05B 33/08* (2020.01)

(52) U.S. Cl.
CPC .......... *A01G 7/045* (2013.01); *H05B 33/086* (2013.01); *H05B 33/0869* (2013.01)

(58) Field of Classification Search
CPC .. A47G 7/045; H05B 33/0869; H05B 33/086; H05B 37/02
USPC .................................................. 362/563, 805
See application file for complete search history.

(56) References Cited

U.S. PATENT DOCUMENTS

| | | | | |
|---|---|---|---|---|
| 8,596,816 B2* | 12/2013 | Atkins | ............... | H05B 33/0848 345/46 |
| 10,188,046 B2* | 1/2019 | Wik | ............... | A01G 7/045 |
| 10,292,340 B2* | 5/2019 | Berinsky | ............... | A01G 7/045 |
| 2010/0039804 A1* | 2/2010 | Budde | ............... | A01G 7/045 362/231 |
| 2012/0063121 A1* | 3/2012 | Atkins | ............... | H05B 33/0848 362/97.1 |
| 2015/0305259 A1* | 10/2015 | Galassi | ............... | A01G 9/16 47/62 R |
| 2016/0113213 A1* | 4/2016 | Berinsky | ............... | A01G 7/045 47/58.1 LS |
| 2017/0117891 A1* | 4/2017 | Lohbihler | ............... | G08C 17/02 |
| 2018/0035616 A1* | 2/2018 | Wagner | ............... | A01G 7/045 |
| 2018/0313760 A1* | 11/2018 | Kramer | ............... | G01N 21/6456 |

* cited by examiner

*Primary Examiner* — William N Harris

(57) ABSTRACT

A method and apparatus are described herein for capturing images of plants using a broad spectrum camera while illuminating the plants with specific light wavelengths from light sources such as light emitting diodes (LEDs). A first light source may be activated, wherein the first light source emits light having a first spectrum toward a bed of a plurality of plants. On a condition that the first light source is activated, a first image of the bed of the plurality of plants may be captured with a broad spectrum camera. A second light source may be activated, wherein the second light source emits light having a second spectrum toward the bed of the plurality of plants. On a condition that the second light source is activated, a second image of the bed of the plurality of plants may be captured with the broad spectrum camera.

20 Claims, 3 Drawing Sheets

SYSTEM AND METHOD FOR HORTICULTURAL LIGHTING

CROSS-REFERENCE TO RELATED APPLICATIONS

This application is a continuation application of U.S. Non-Provisional application Ser. No. 15/590,847 filed May 9, 2017, now U.S. Pat. No. 10,368,497.

FIELD OF INVENTION

This invention relates to the field of horticultural lighting applications using light-emitting diode (LED) light sources.

BACKGROUND

Semiconductor light-emitting devices including but not limited to light emitting diodes (LEDs), resonant cavity light emitting diodes (RCLEDs), vertical cavity laser diodes (VCSELs), and edge emitting lasers are among the most efficient light sources available. Materials systems used in the manufacture of high-brightness light emitting devices that are capable of operation across the visible spectrum include Group III-V semiconductors. LEDs that emit blue light may be formed from binary, ternary, and quaternary alloys of gallium, aluminum, indium, and nitrogen, which are also referred to as III nitride materials. LEDs that emit red light may be formed from binary, ternary, and quaternary alloys of gallium, aluminum, indium, arsenic, and phosphorus.

Light emitting devices may be fabricated by epitaxially growing a stack of semiconductor layers of different compositions and dopant concentrations on a GaAs, sapphire, silicon carbide, III-nitride, III-phosphide, III-arsenide, silicon, or other suitable substrate by metal-organic chemical vapor deposition (MOCVD), molecular beam epitaxy (MBE), or other epitaxial techniques. The stack of semiconductor layers may include one or more n-type layers doped with, for example, Si, formed over the substrate, one or more light emitting layers in an active region formed over the n-type layer or layers, and one or more p-type layers doped with, for example, Mg, formed over the active region. Electrical contacts may be formed on the n-type and p-type regions.

SUMMARY

A method and apparatus are described herein for capturing images of plants using a broad spectrum camera while illuminating the plants with specific light wavelengths from light sources such as LEDs. A first light source may be activated, wherein the first light source emits light having a first spectrum toward a bed of a plurality of plants. On a condition that the first light source is activated, a first image of the bed of the plurality of plants may be captured with a broad spectrum camera. A second light source may be activated, wherein the second light source emits light having a second spectrum toward the bed of the plurality of plants. On a condition that the second light source is activated, a second image of the bed of the plurality of plants may be captured with the broad spectrum camera. Images captured by the broad spectrum camera may be stored in a memory device and transmitted via a communication interface to a network.

Occupancy of the environment of the bed of the plurality of plants may also be detected. Occupancy may be detected via a sensor, for example, by detecting motion in the location near the bed of the plurality of plants. On a condition that occupancy is not detected, a first light source may be activated. The first light source may emit light toward a bed of a plurality of plants from a blue light emitting LED and a red light emitting LED. On a condition that occupancy is detected, a second light source may be activated. The second light source may emit light toward the bed of the plurality of plants from a white light emitting LED. The sensor may also receive wireless communication signals to activate the light sources and to generate and transmit data associated with the bed of the plurality of plants to a network.

DETAILED DESCRIPTION

The embodiments described herein are directed to systems and methods that may be used for horticultural applications.

The absorption of light by chlorophyll in plants is one of the crucial components of photosynthesis. Chlorophyll absorbs light in the red and the blue wavelength ranges of the visible light spectrum. A substantial amount of green light incident on plants is not absorbed but is reflected.

Figure 1:
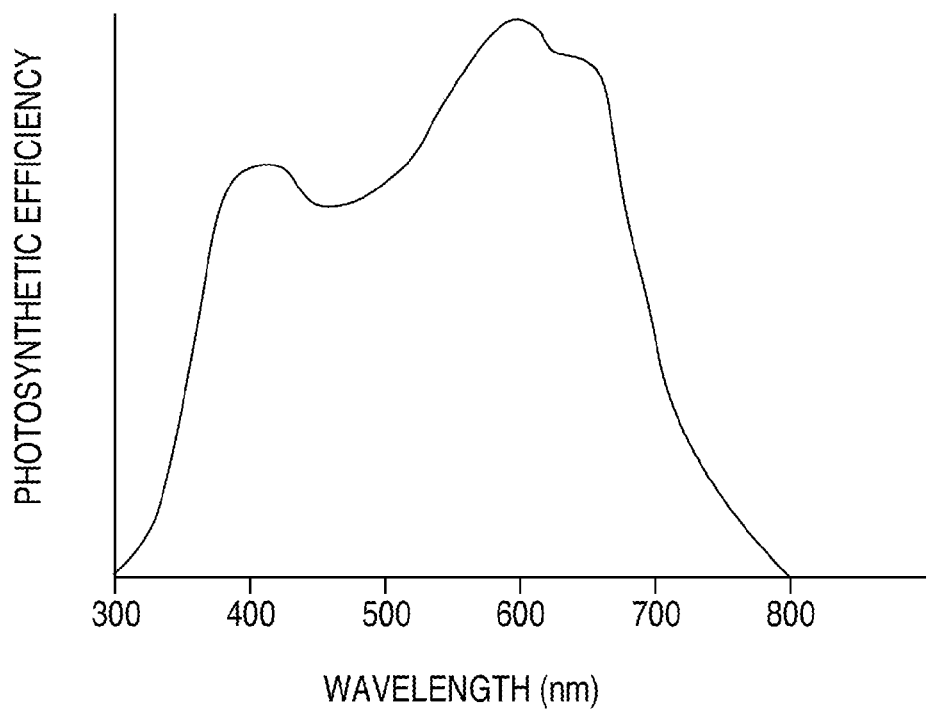
FIG. 1 is a plot of photosynthetic efficiency (arbitrary units) as a function of wavelength (nm)

FIG. 1 is a plot of photosynthetic efficiency, in arbitrary units, as a function of wavelength, in nanometers 101. As illustrated in FIG. 1, the photosynthetic efficiency of plants is highest in the wavelength range between 600 and 700 nm, a wavelength range that includes red light. Photosynthetic efficiency is also high between 400 and 450 nm, a wavelength range that includes blue light. Photosynthetic efficiency is relatively low between 450 and 600 nm, a wavelength range that includes green and yellow light. Horticultural lighting devices are thus designed to emit more red and blue light than green light, compared to lighting devices for other applications, such as illumination and backlighting.

Figure 2:
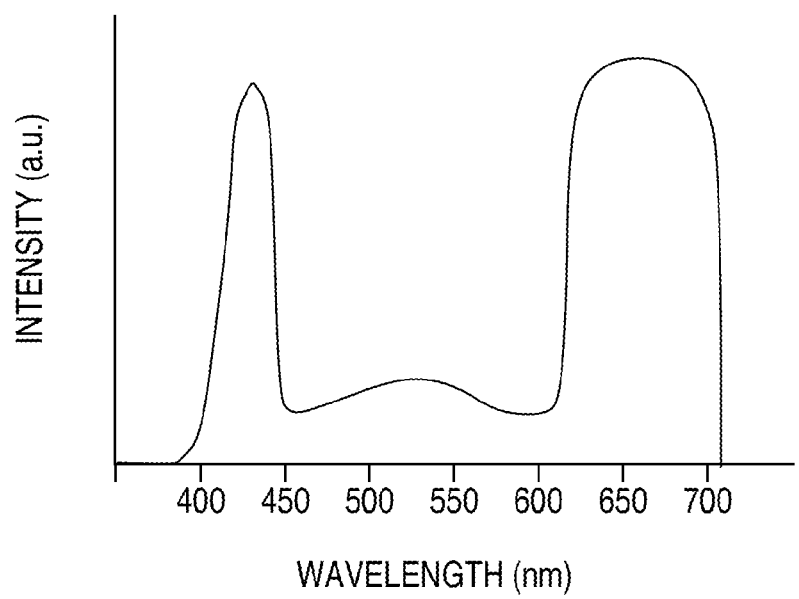
FIG. 2 is a plot of intensity (arbitrary units) as a function of wavelength (nm) for a horticultural lighting device.

FIG. 2 illustrates one example of a suitable spectrum for a horticultural lighting device 200. FIG. 2 is a plot of intensity in arbitrary units as a function of wavelength, in nanometers. The lighting device illustrated in FIG. 2 emits light between 400 and 450 nm (blue light) at high intensity and light between 600 and 700 nm (red light.) at high intensity. Though the device illustrated in FIG. 2 emits little yellow or green light, in some embodiments it may emit more yellow or green light, or none at all. In some embodiments, light that is ultraviolet or infrared, and/or light that is yellow, green, orange, or any other color may be part of the spectrum emitted by a horticultural lighting device.

As used herein, in the embodiments described herein, horticultural lighting or a horticultural light source may refer to a device or devices that, for example, may emit light that has a higher intensity of blue light (400 to 450 nm light, for example) than green-yellow light (450 nm to 600 nm, for example); a device or devices that emit light that has a higher intensity of red light (600 to 700 nm light, for example) than green-yellow light (450 nm to 600 nm, for example); or a device or devices that emit light that has a higher intensity of blue and red light (400 to 450 nm and 600 to 700 nm light, for example) than green-yellow light (450 nm to 600 nm, for example). The horticultural light sources used in the various embodiments described herein may also emit white light.

The area under a plot of intensity as a function of wavelength between 400 and 450 nm may be greater than the area under the plot between 450 and 600 nm; the area under the plot between 600 and 700 nm may be greater than the area under the plot between 450 and 600 nm; or the area under the plot between 400 and 450 nm and between 600 and 700 nm may be greater than the area under the plot between 450 and 600 nm. Horticultural lighting may, for example, refer to a device or devices that emit light with a peak wavelength in the range of 400 to 450 nm that has a greater intensity than a peak wavelength in the range of 450 to 600 nm, or a device or devices that emit light with a peak wavelength in the range of 600 to 700 nm that has a greater intensity than a peak wavelength in the range of 450 to 600 nm.

Plant health may be assessed by way of visual inspection. A spectrogram may reveal details about the inner working of the plant. The relative absorption of wavelengths of light may infer the presence or activity of specific chlorophylls, carotenoids, and other light absorbing molecules. Normal vision (i.e. trichromatic or red, green, blue (RGB)) is of limited diagnostic value because of its inability to distinguish absolute color in the way that a spectrogram does. The human eye cannot distinguish a pure color, such as yellow, from a combination of red and green triggering the same visual experience. RGB cameras, which are designed to mimic the human eye, also suffer from this deficiency. As a result, plant health is often observed via multi-spectral cameras that use multiple filters to selectively image each wavelength of light. These multi spectral cameras are complex, expensive, and slow. Crop imaging is typically performed aerially or by satellite. Indoor plant monitoring is difficult due to the expense of the cameras and the difficulty of photographing from above. Both problems can be overcome by placing a monochromatic camera within the lighting fixture and using the multi-spectral lighting to selectively illuminate the plant bed.

In the embodiments described herein, horticultural light sources may be activated in response to detected status changes in the environment of plants, horticultural light sources may be activated in response to detected occupancy in the environment of plants, and horticultural light sources may be activated when capturing images of plants in order to observe plant health. The embodiments described herein use LEDs as the horticultural lighting source for exemplary purposes, but other lighting sources may be used.

Figure 3:
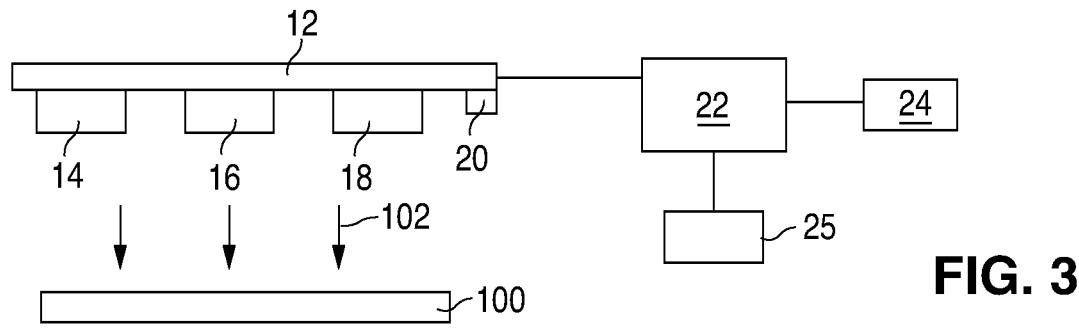
FIG. 3 illustrates a horticultural lighting system including a sensor.

FIG. 3 is a diagram of an example horticultural lighting system 300. The horticultural lighting system 300 may include a horticultural light source such as at least one LED of a plurality of LEDs. The example system of FIG. 3 includes LEDs 14, 16, and 18. However, the horticultural lighting system 300 may use any number of LEDs. In an example embodiment, LED 14 may be a blue-emitting LED, LED 16 may be a red-emitting LED, and LED 18 may be a white-emitting LED. In another example embodiment, at least one of LEDs 14 and 16 may be a blue-emitting LED with a red-emitting wavelength converting material disposed in the path of the blue light. Any suitable LEDs may be used in the horticultural lighting system 300.

In the example system of FIG. 3, LEDs 14, 16, and 18 may be mounted on mount 12. Mount 12 may be any structure that provides power to the LEDs used in system 300. Mount 12 may include a separate control channel and a means for switching all or part of the driving current from a horticultural light source (for example, LEDs 14, 16, and 18) to the control channel. Mount 12 may be, for example, a printed circuit board. Mount 12 may be coupled to a processor 22 and communication interface 25. Mount 12 may also have wired connectivity via an Ethernet (IEEE 802.3 standard) based network, wireless connectivity via an IEEE 802.11 based wireless local area network (WLAN) and/or a cellular connection based on 3GPP standards, and/or short range wireless connectivity to mobile phones or other devices, such as a Bluetooth wireless communication interfaces, infrared interfaces, or any other suitable short range wireless communication interface such a LiFi. Mount 12 may be capable of receiving control signals from a network that controls the horticultural light source (for example, LEDs 14, 16, and 18).

LEDs 14, 16, and 18 may be directed in specific directions, where a plant or a bed of a plurality of plants in plant bed 100 may be positioned. LEDs 14, 16, and 18 may direct light 102 toward the plant bed 100.

Processor 22 may be, for example and without limitation, a microprocessor or a plurality of microprocessors, a single-core or multi-core processor, a general purpose processor, a special purpose processor, a conventional processor, a Graphics Processing Unit (GPU), a digital signal processor (DSP), one or more microprocessors associated with a DSP core, a controller, a microcontroller, or any other any unit, module, or machine capable of executing a sequence of instructions.

Processor 22 may control the operation of LEDs 14, 16, and 18 and control the supply power to LEDs 14, 16, and 18. Processor 22 may execute instructions stored in memory device 24 coupled to the processor 22. Examples of instructions that may be executed by the processor 22 are described herein.

Memory device 24 may be, for example, a device such as a Dynamic Random Access Memory (D-RAM), Static RAM (S-RAM), other RAM, a flash memory, or any other suitable computer-readable medium such as a non-transitory computer readable medium for storing results, for example, generated by sensors, or any other data. Examples of a computer-readable medium include, but are not limited to, a register, a cache memory, an electronic circuit, a fiber optic medium, a Read Only Memory (ROM), a semiconductor memory device (such as any type of RAM), a magnetic medium (such as a hard disk drive, a tape drive, a magneto-optical medium, or a floppy drive), a flash memory medium (such as a USB flash drive or a flash memory card), a flash based or D-RAM based solid-state drive (SSD); an optical disk (such as CDs, DVDs, or BDs), or any other suitable device for electronic data storage.

The processor 22 may also be coupled to communication interface 25. Communication interface 25 may be, for example, any device capable of communicating with a network and communicating results or any other suitable data. Communication interface 25 may also include transceivers, receivers, and/or transmitters capable of providing access and communicating in a wireless or a wired network. For example, communication interface 25 may have wired connectivity via an Ethernet (IEEE 802.3 standard) based network. For example, communication interface 25 may also have wireless connectivity via an IEEE 802.11 based wireless local area network (WLAN) and cellular connection based on 3GPP standards. In another example, communication interface 25 may also have short range wireless connectivity to mobile phones or other devices, such as Bluetooth wireless communication interfaces, infrared interfaces, LiFi, or any other suitable short range wireless communication interface.

Communication interface 25 may also include a display or connection to a display device. Communication interface 25 may also include a device or devices for receiving user inputs such as, for example, a keyboard, a mouse, or touchscreen.

The example system of FIG. 3 may include sensor 20. Sensor 20 may be an electronic sensor or other monitor or detection device such as a camera or a voice recognition device. For example, sensor 20 may be an ultrasonic sensor, a color sensor, a humidity sensor, a temperature sensor, and/or a motion sensor. In some embodiments, sensor 20 is a motion sensor, or any other sensor that may detect occupancy of an area or location, for example by a person. Sensor 20 may generate data per plant, plant bed, light fixture, LED, or plurality of LEDs. Sensor 20 may be able to send results or any other data generated to memory device 24 and/or communications interface 25 for storage and/or transmission over a network. Data generated by sensor 20 may be sent over a network, such as the Internet, to a central site. Alternatively or additionally, data generated by sensor 20 may be downloaded to a wireless communications device such as a mobile phone or other handheld device or laptop computer. The data generated by sensor 20 may be downloaded to the wireless communications device on a per plant, per plant bed, per light fixture, per LED, or per plurality of LEDs basis.

Sensor 20 may be positioned on mount 12 in the same location as the light source for horticultural lighting (for example, LEDs 14, 16, and 18). Horticultural lighting source such as LEDs 14, 16, and 18 in the example horticultural lighting system 300 may be mounted directly over plant bed 100, for example, with one lighting system per plant bed, which may for example optimize light distribution to plant bed 100. In one example embodiment, sensor 20 of horticultural lighting system 300 may monitor and detect various events or changes in the environment of horticultural lighting system 300. Sensor 20 may be mounted such that it does not interfere or significantly absorb light emitted by the light source for horticultural lighting (for example, LEDs 14, 16, and 18).

Because horticultural light is often dominated by blue and red wavelengths, the color rendering index of horticultural light is very low. Horticultural light is therefore unpleasant for working, and makes accurate visual inspection of plants difficult. In some embodiments, system 300 of FIG. 3 may include an LED (for example, LED 18) that may emit white light (i.e., a light with a color rendering index more suitable for working, or for visual inspection of plants), or a light of a color that when mixed with the horticultural light sources, creates light with a color rendering index more suitable for working, or for visual inspection of plants. In some embodiments, LED 18 may be a blue-emitting LED combined with one or more wavelength converting materials to make white light, or LED 18 may be, for example, a green-yellow emitting LED that fills in the spectrum created by the other horticultural light sources.

Figure 4:
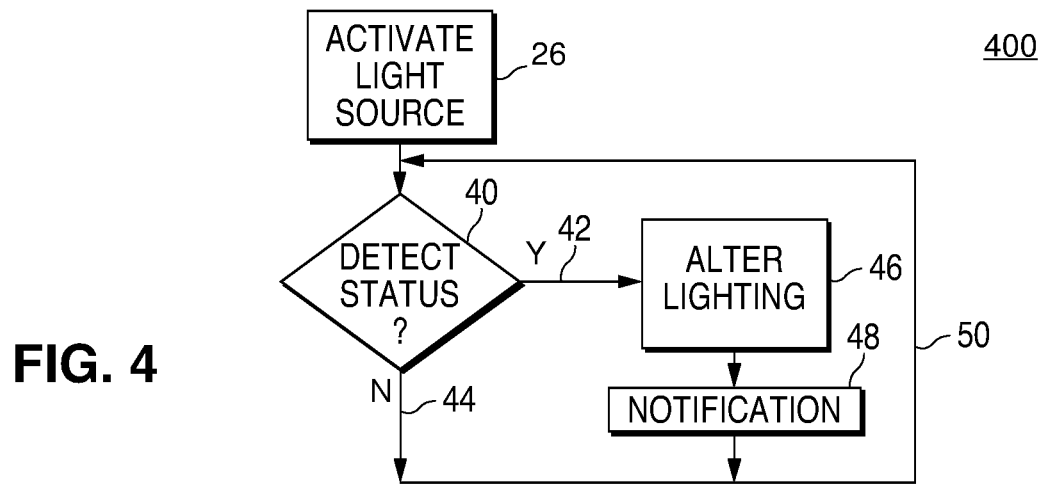
FIG. 4 is a flow diagram of a status detection method performed on the system of FIG. 3.

FIG. 4 is a flow diagram of an example process 400 for detecting status changes in a horticultural lighting system that may be performed in the example system 300 described above and used in combination with any of the embodiments described herein. While each step of the procedure 400 in FIG. 4 is shown and described separately, multiple steps may be executed in a different order than what is shown, in parallel with each other, or concurrently with each other. The process of FIG. 4 is performed by system 300 for exemplary purposes, but it could also be performed by any of the devices and systems described herein. For example, the process 400 of in FIG. 4 may be stored in memory device 24 and executed by processor 22. In the example process 400 of in FIG. 4, sensor 20 may be a sensor as described above with respect to FIG. 3 that is capable of detecting various status changes such as status associated with ultrasound, color, humidity, or temperature.

In the example of FIG. 4, a light source for horticultural lighting is activated 26. Sensor 20 may detect a status 40. The status 40 may be, for example, plant canopy height and/or plant canopy density, and/or any other suitable status that may be detected by ultrasound. The status 40 detected may be, for example, a measure of leaf health and/or a measure of bloom status, and/or any other suitable status that may be detected by a color sensor. The status 40 detected may be, for example, a change in humidity. The status 40 detected may be, for example, a change in temperature. Sensor 20 may detect the status automatically (for example, at a predetermined time, or after a predetermined interval), after the occurrence of a predetermined event, or after a user-generated input, for example received by communication interface 25. In some embodiments, the status 40 detected may be reception of a signal from a remote control, a voice activation signal, or a signal from a wireless communications device such as a mobile phone or other device operating in a wireless communication system such as, for example, an IEEE 802.11 WLAN, a cellular network, or via a Bluetooth interface. The signal may be received by communication interface 25 or by sensor 20.

If the detected status 44 indicates no change, the light source is unchanged. If the detected status 42 indicates a change, the horticultural lighting is altered 46. For example, the amount of current supplied to LEDs in the light source may be altered, or some LEDs may be activated or deactivated when altered 46. Any suitable alteration of the horticultural lighting may be performed. In another example, the horticultural lighting is altered 46 by cycling through the many LED colors to increase the sensitivity of a camera to specific plant photoreceptors.

Notification 48 may be generated and communicated in system 300. For example, the time and details of the alteration 46 may be stored in memory device 24 or communicated to a user via communication interface 25. The system may then wait 50 for the next status detection event.

Figure 5:
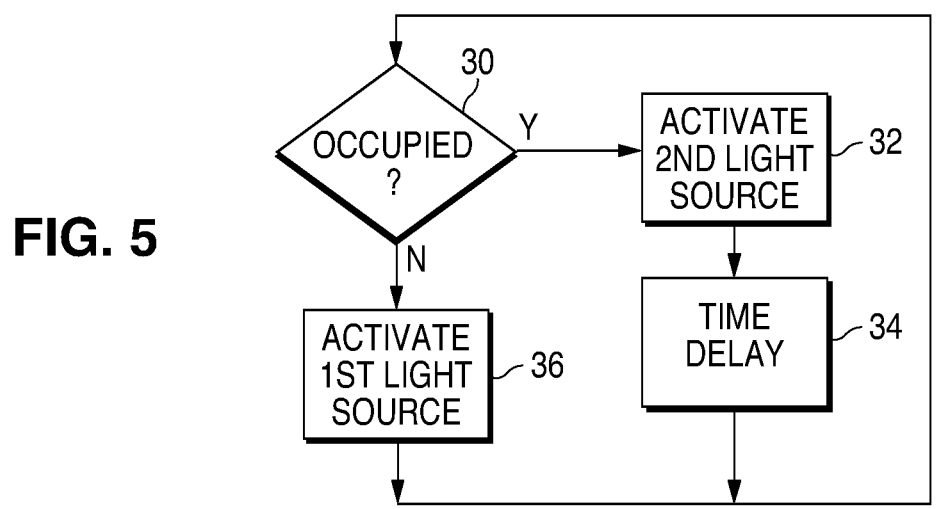
FIG. 5 is a flow diagram of an occupancy detection method performed on the system of FIG. 3.

FIG. 5 is a flow diagram of an example process 500 for detecting occupancy in a horticultural lighting system that may be performed in the example system 300 described above and used in combination with any of the embodiments described herein. While each step of the procedure 500 in FIG. 5 is shown and described separately, multiple steps may be executed in a different order than what is shown, in parallel with each other, or concurrently with each other. The process of FIG. 5 is performed by system 300 for exemplary purposes, but it could also be performed by any of the devices and systems described herein. For example, the process 500 of in FIG. 5 may be stored in memory device 24 and executed by processor 22. In the example process 500 of in FIG. 5, sensor 20 may be a sensor as described above with respect to FIG. 3 that is capable of detecting occupancy such as by motion, temperature change, or by reception of a signal.

In the example of FIG. 5, sensor 20 may determine whether an area is occupied 30. Occupancy may, for example, be detected based on detection of motion within a predetermined distance from the plant bed 100. In another example, occupancy may be based on a temperature change or humidity change. If occupancy is not detected, a first light source may be activated 36. The first light source may, for example, be the horticultural light source (for example, LEDs 14, 16, and/or 18).

If occupancy is detected, a second light source may be activated 32. The second light source may, for example be a white light source (for example, LEDs 14, 16, and/or 18). The spectra of the horticultural light source and the white light source may be different. Alternatively, white light may be produced by filling in missing spectrum between red and blue dominant horticultural lighting. Other modes such as reducing the normal lighting power and backfilling the spectrum may also be used.

In some embodiments, occupancy may be detected and the second light source activated 32 when sensor 20 receives a signal via a remote control signal, via voice activation, or when sensor 20 receives a wireless signal from a wireless communications device such as a mobile phone or other device operating in a wireless communication system such as, for example, an IEEE 802.11 WLAN, a cellular network, LiFi, or Bluetooth signal.

When the second light source is activated 32, the activation of the second light source may be in accordance with a preconfigured mode or user specific mode. For example, one mode may activate all LEDs (for example, LEDs 14, 16, and 18) or only a portion of the LEDs (for example, only LED 14, 16, or 18 or a combination of two of LEDs of 14, 16, or 18). These modes may, for example, be preconfigured based on an inspection mode or a task associated with a specific user.

In some embodiments, after a time delay 34, sensor 20 may restart the process 500. The time delay 34 may be configured by a user and/or stored in memory device 24.

As described above, the environment of plants is typically illuminated with broad spectrum light (i.e. white light) from a source such as the sun. Multi-spectral cameras as described above may then be used to analyze the plants.

Figure 6:
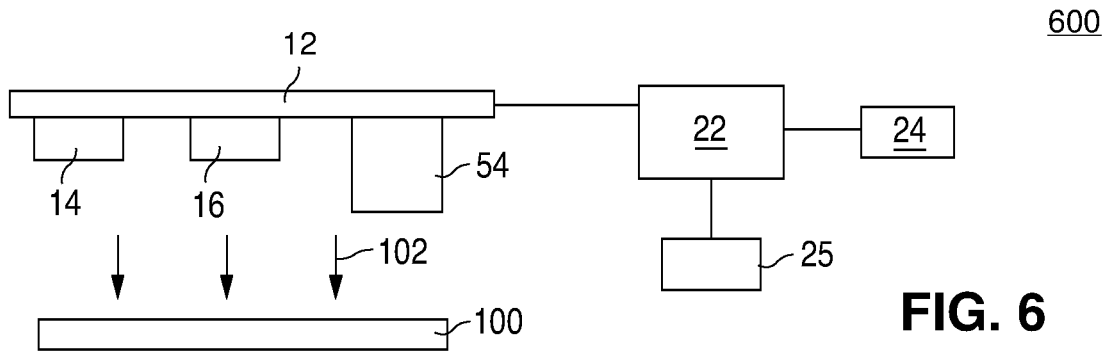
FIG. 6 illustrates a horticultural lighting system configured to observe plant health.

FIG. 6 is a diagram of an example horticultural lighting system 600 configured to observe plant health. The horticultural lighting system 600 may include a horticultural light source such as at least one LED of a plurality of LEDs, which in the example of FIG. 6 are LEDs 14 and 16. The example system 600 may also include processor 22, memory device 24, communication interface 25, plant bed 100, and mount 12 as described above with respect to FIG. 3. The example system 600 may include other components such as sensors or any other device described herein.

LEDs 14 and 16 may include multiple narrow-band light sources. Narrow-band as used in the embodiments described herein may refer to an LED that emits 95% of light from the LED in a wavelength band no wider than 100 nm in some embodiments, no more than 50 nm in some embodiments, and no more than 30 nm in some embodiments. Though two LEDs 14 and 16 are illustrated in the example of FIG. 6, any number of LEDs may be used such as LED 18 as described above with respect to FIG. 3 or more LEDs. The wavelength bands of the LEDs used in the horticultural light source may be selected to target light absorbing compounds of the plants grown in system 600 of FIG. 6. Accordingly, the system of 600 is capable of illuminating the plant environment with narrow-band light, which may enable observation of the health of the plants in plant bed 100.

For example, LEDs 14 and 16 may sweep across light wavelengths in the spectra of interest while capturing images of plant bed 100 with a broad spectrum, black and white (B&W) camera, such as camera 54. Camera 54 may be controlled by processor 22. LEDs 14 and 16 of the horticultural light source and camera 54 may be attached to mount 12.

Camera 54 may be positioned to capture images of the plants in plant bed 100 disposed beneath LEDs 14 and 16. Images captured by camera 54 may be stored by memory device 24 and transmitted over a network, such as, for example, the Internet, a WLAN, or a cellular network, via communication interface 25. Camera 54 may be mounted such that it does not interfere or significantly absorb light emitted by the light source for horticultural lighting (for example, LEDs 14 and 16).

LEDs 14 and 16 may be individually controlled and activated by, for example, processor 22 of system 600 to produce specific spectra and illuminate plant bed 100 with narrow-band light 102 of different wavelengths. Processor 22 may run through the available LED wavelengths, activate the appropriate LEDs producing light 102 in those wavelengths, and activate camera 54 to capture images of plant bed 100. By selectively illuminating plant bed 100 with each wavelength of interest and capturing an image with camera 54 under that illumination, the relative absorption by the plants in those wavelengths may be efficiently measured. The relative absorption of different wavelengths may indicate the presence or activity of specific chlorophylls, carotenoids, and other light absorbing molecules, which may indicate the health of the plant. As a result, the use of high-cost multi-spectral cameras may be avoided.

In another example, specific mixes of spectra may be activated by LEDs 14 and 16, which may direct the growth of the plants in beneficial ways.

Figure 7:
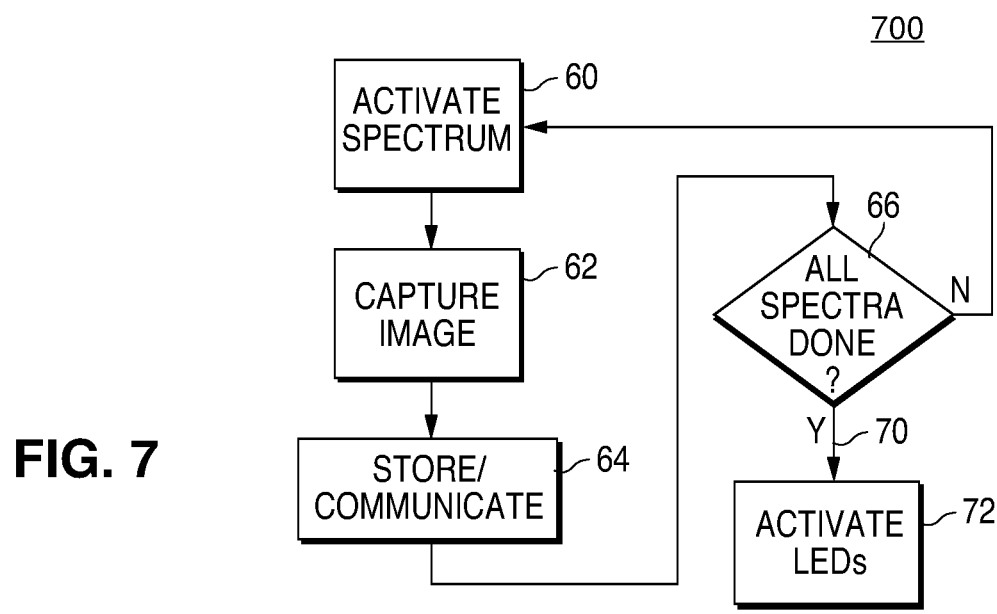
FIG. 7 is a flow diagram of a method performed on the system of FIG. 6.

FIG. 7 is a flow diagram of an example process 700 for observing plant health by capturing images of plants under illumination in light of various wavelengths in a horticultural lighting system that may be performed in the example system 300 or 600 described above and used in combination with any of the embodiments described herein. While each step of the procedure 700 in FIG. 7 is shown and described separately, multiple steps may be executed in a different order than what is shown, in parallel with each other, or concurrently with each other. The process of FIG. 7 is performed by system 300 or 600 for exemplary purposes, but it could also be performed by any of the devices and systems described herein. For example, the process 700 of in FIG. 7 may be stored in memory device 24 and executed by processor 22. In the example process 700 of in FIG. 7, camera 54 may be a camera as described above with respect to FIG. 6 or any camera capable of performing the process 700 of FIG. 7.

In the example of FIG. 7, a first portion of the horticultural light source spectrum may be activated 60. For example, a single narrow-band LED may be activated. An image of a target (such as a plant or plant bed) may be captured 62 by camera 54. The image may be stored and/or communicated 64 by memory device 24 and communication interface 25. For example, the image may be displayed on a monitor, sent to a cellular phone, and/or stored in memory. The system then may determine whether all spectra of interest are done 66. If all spectra of interest are completed 70, all the LEDs in the horticultural light source may be activated 72 or re-activated. When the horticultural light source is activated 72, monitoring has ended, and the system returns to illuminating the plants for growth. If all spectra are not completed, the system restarts the process 700, and the next portion of the horticultural light source spectrum is activated 60. The first portion of the horticultural light source spectrum may be deactivated, such that only one spectrum is activated per image, during monitoring. For example, a different narrow-band LED may then be activated.

Though in the examples above the semiconductor light emitting devices are III-nitride LEDs that emit blue or UV light and III-phosphide or III-arsenide LEDs that emit red or other colored light, semiconductor light emitting devices besides LEDs such as laser diodes and semiconductor light emitting devices made from other materials systems such as other III-V materials, II-VI materials, ZnO, or Si-based materials may be used. Blue or UV emitting light emitting devices may be combined with one or more wavelength converting materials to produce different colors of light, such that combined light from the light emitting device and the wavelength converting materials appears white or any other color necessary for a given application.

Figure 8:
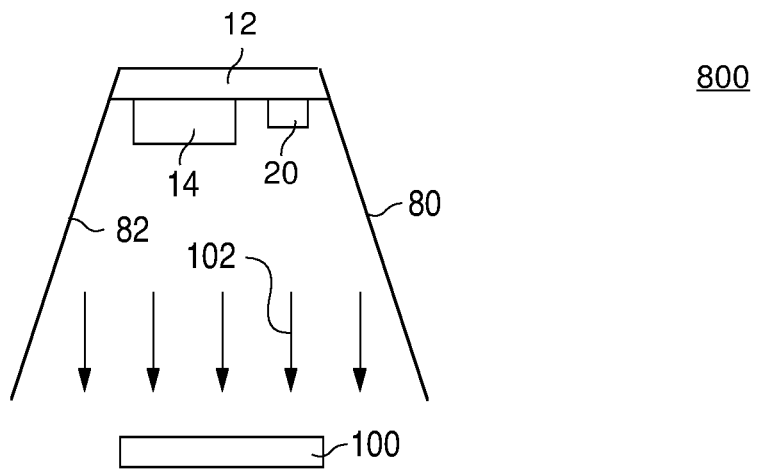
FIG. 8 illustrates an LED and a sensor attached to a mount, and positioned within a structure with reflective sidewalls.

FIG. 8 is a diagram of an example horticultural lighting system 800. The example horticultural lighting system 800 may include sensor 20 and mount 12 as described above with respect to FIG. 3. The example horticultural lighting system 800 may include a horticultural light source such as at least one LED 14 emitting light 102 toward plant bed 100. Though one LED (LED 14) is illustrated in the example of FIG. 8, any number of LEDs may be used such as LED 16 and 18 as described above with respect to FIG. 3 or more LEDs.

In the example horticultural lighting system 800 of FIG. 8, sensor 20 is mounted such that it does not interfere or significantly absorb light emitted by the light source. FIG. 8 is a cross section of a part of a horticultural lighting system 800 that illustrates one example of mounting sensor 20. In FIG. 8, at least one LED 14 which is all or part of the horticultural light source is attached to mount 12. Structure 80, which may include reflective sidewalls 82 angled out from the light source, may direct light 102 toward plant bed 100. Sensor 20 is attached to mount 12 adjacent to LED 14. LED 14 may include an optic (not shown) to direct light away from sensor 20 and toward the output direction illustrated by light 102. Sensor 20 may be positioned such that it does not absorb a significant amount of light from the horticultural light source.

Having thus described various embodiments, it is to be appreciated and will be apparent to those skilled in the art that many physical changes, only a few of which are exemplified in the detailed description above, may be made in the methods and apparatuses described herein without altering the inventive concepts and principles embodied herein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

Although features and elements are described above in particular combinations, it is to be appreciated that each feature or element can be used alone or in any combination with or without the other features and elements. Any single embodiment described herein may be supplemented with one or more elements from any one or more of the other embodiments described herein. Any single element of an embodiment may be replaced with one or more elements from any one or more of the other embodiments described herein. For example, each feature or element as described herein with reference to any one of FIGS. 1-8 may be used alone without the other features and elements or in various combinations with or without other features and elements from each or any combinations of the other figures from FIGS. 1-8. Sub-elements of the methods and apparatuses described herein with reference to FIGS. 1-8 may be performed in any arbitrary order (including concurrently) in any combination or sub-combination.

What is claimed is:

1. A method for observing plant health comprising:
capturing a first image of a plant with a broad spectrum camera while the plant is being illuminated by a first narrow-band light from a first LED; and
capturing a second image of the plant with the broad spectrum camera while the plant is being illuminated by a second narrow-band light from a second LED and not illuminated by the first narrow-band light;
determining a relative absorption by the plant of the first narrow-band light and the second narrow-band light using the first and second images, where the relative absorption is an indication of health of the plant.

2. The method of claim 1, wherein the first narrow-band light includes blue light.

3. The method of claim 1, wherein the second narrow-band light includes red light.

4. The method of claim 1, further comprising simultaneously illuminating the plant with the first narrow-band light and the second narrow-band light.

5. A system comprising:
a first LED configured to emit light having a first narrow-band spectrum toward a plant;
a second LED configured to emit light having a second narrow-band spectrum toward the plant;
a broad spectrum camera configured to capture a first image of the plant while the plant is being illuminated by the first spectrum of light and not being illuminated by the second spectrum of light; and
the broad spectrum camera further configured to capture a second image of the plant while the plant is being illuminated by the second spectrum of light and not being illuminated by the first spectrum of light.

6. The system of claim 5, wherein the first narrow-band spectrum is different from the second narrow-band spectrum.

7. The system of claim 5, wherein the first narrow-band spectrum includes blue light.

8. The system of claim 5, wherein the second narrow-band spectrum includes red light.

9. The system of claim 5, further comprising:
a third LED configured to emit light having a third narrow-band spectrum toward the plant; and
the broad spectrum camera further configured to capture a third image of the plant while the plant is being illuminated by the third spectrum of light and not being illuminated by the first and second spectrums of light.

10. The system of claim 5, wherein the broad spectrum camera is mounted such that it does not absorb light from the first LED or the second LED.

11. A method comprising:
  detecting whether a space near a plant is occupied by a person;
  if occupancy is not detected, illuminating plant with light from a first LED configured to emit blue light and from a second LED configured to emit red light; and
  if occupancy is detected, illuminating plant with a light from the first LED, from the second LED, and from a third LED configured to emit light of a different color from blue or red LED.

12. The method of claim 11, wherein the light of a different color from blue or red is green-yellow light.

13. The method of claim 11, wherein the light from the first, second, and third LEDs combine to make white light.

14. The method of claim 11, further comprising detecting whether a space near a plant is occupied a second time after a time delay.

15. The method of claim 14, further comprising if occupancy is not detected the second time, illuminating the plant with light from the first and second LEDs but not the third LED.

16. A method for controlling horticultural lighting comprising:
  illuminating a plant with a first narrow-band light from a first LED and a second narrow-band light from a second LED;
  capturing a first image of a plant with a broad spectrum camera while the plant is being illuminated by the first narrow-band light and not illuminated by the second narrow-band light;
  capturing a second image of the plant with the broad spectrum camera while the plant is being illuminated by the second narrow-band light and not illuminated by the first narrow-band light;
  determine a relative absorption by the plant of the first narrow-band light and the second narrow-band light using the first and second images; and
  altering the amount of current supplied to the first LED or second LED if a change in the relative absorption is determined.

17. The method of claim 16 wherein the determination of relative absorption occurs at a predetermined time.

18. The method of claim 16 wherein the determination of relative absorption occurs at predetermined intervals.

19. The method of claim 16 wherein altering the amount of current supplied comprises supplying no current.

20. The method of claim 16 wherein the first narrow-band light comprises blue light and the second narrow-band light comprises red light.

\* \* \* \* \*